(12) United States Patent
Kassayan et al.

(10) Patent No.: US 10,109,289 B2
(45) Date of Patent: *Oct. 23, 2018

(54) SYSTEMS AND METHODS FOR INTRA-ORAL BASED COMMUNICATIONS

(71) Applicant: SoundMed LLC, Mountain View, CA (US)

(72) Inventors: Reza Kassayan, Atherton, CA (US); John Spiridigliozzi, Boston, MA (US)

(73) Assignee: SoundMed, LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/005,860

(22) Filed: Jan. 25, 2016

(65) Prior Publication Data

US 2016/0217804 A1    Jul. 28, 2016

Related U.S. Application Data

(63) Continuation of application No. 14/176,666, filed on Feb. 10, 2014, now Pat. No. 9,247,332, which is a continuation of application No. 13/615,189, filed on Sep. 13, 2012, now Pat. No. 8,649,536, which is a continuation of application No. 12/175,240, filed on Jul. 17, 2008, now Pat. No. 8,295,506.

(51) Int. Cl.
| | |
|---|---|
| *G10L 21/0216* | (2013.01) |
| *H04R 25/00* | (2006.01) |
| *H04R 1/08* | (2006.01) |
| *H04R 1/32* | (2006.01) |
| *H04R 1/46* | (2006.01) |
| *B33Y 80/00* | (2015.01) |

(52) U.S. Cl.
CPC ............ *G10L 21/0216* (2013.01); *H04R 1/08* (2013.01); *H04R 1/083* (2013.01); *H04R 1/326* (2013.01); *H04R 1/46* (2013.01); *H04R 25/407* (2013.01); *H04R 25/606* (2013.01); *B33Y 80/00* (2014.12); *G10L 2021/02166* (2013.01); *H04R 25/554* (2013.01); *H04R 2410/01* (2013.01); *H04R 2460/01* (2013.01); *H04R 2460/13* (2013.01)

(58) Field of Classification Search
CPC ...... G10L 21/0216; G10L 2021/02166; H04R 1/326; H04R 1/46; H04R 1/083; H04R 1/08; H04R 25/407; H04R 25/606; H04R 2410/01; H04R 25/554; H04R 2460/01; H04R 2460/13

See application file for complete search history.

(56) References Cited

U.S. PATENT DOCUMENTS

| | | | | |
|---|---|---|---|---|
| 2,161,169 | A | * 6/1939 | Jefferis, Jr. | ............... A61F 9/08 181/127 |
| 4,478,224 | A | 10/1984 | Bailey | |

(Continued)

FOREIGN PATENT DOCUMENTS

| | | |
|---|---|---|
| WO | WO 2001/095666 | 12/2001 |
| WO | WO 2009/111566 | 9/2009 |
| WO | WO 2010/009018 | 1/2010 |

*Primary Examiner* — Marc Armand
*Assistant Examiner* — Sue Tang
(74) *Attorney, Agent, or Firm* — Levine Bagade Han LLP

(57) ABSTRACT

Systems and methods are disclosed for capturing sound for communication by mounting one or more intra-oral microphones to capture sound; and mounting a mouth wearable communicator in the oral cavity to communicate sound with a remote unit.

12 Claims, 13 Drawing Sheets

(56) References Cited

U.S. PATENT DOCUMENTS

| | | | |
|---|---|---|---|
| 6,633,747 B1 | 10/2003 | Reiss | |
| 6,849,536 B2 | 2/2005 | Lee et al. | |
| 8,295,506 B2 * | 10/2012 | Kassayan | H04R 25/407 |
| | | | 381/326 |
| 8,649,536 B2 * | 2/2014 | Kassayan | H04R 25/407 |
| | | | 381/151 |
| 9,247,332 B2 * | 1/2016 | Kassayan | H04R 25/407 |
| 2005/0196008 A1 * | 9/2005 | Anjanappa | H04R 17/02 |
| | | | 381/380 |
| 2006/0270467 A1 | 11/2006 | Song et al. | |
| 2007/0142072 A1 | 6/2007 | Lassally | |
| 2007/0280495 A1 * | 12/2007 | Abolfathi | A61C 5/00 |
| | | | 381/326 |
| 2008/0064993 A1 | 3/2008 | Abolfathi et al. | |
| 2008/0144876 A1 | 6/2008 | Reining et al. | |
| 2008/0159559 A1 | 7/2008 | Akagi et al. | |
| 2009/0149722 A1 | 6/2009 | Abolfathi et al. | |
| 2010/0014689 A1 | 1/2010 | Kassayan et al. | |
| 2013/0003997 A1 | 1/2013 | Kassayan et al. | |

* cited by examiner

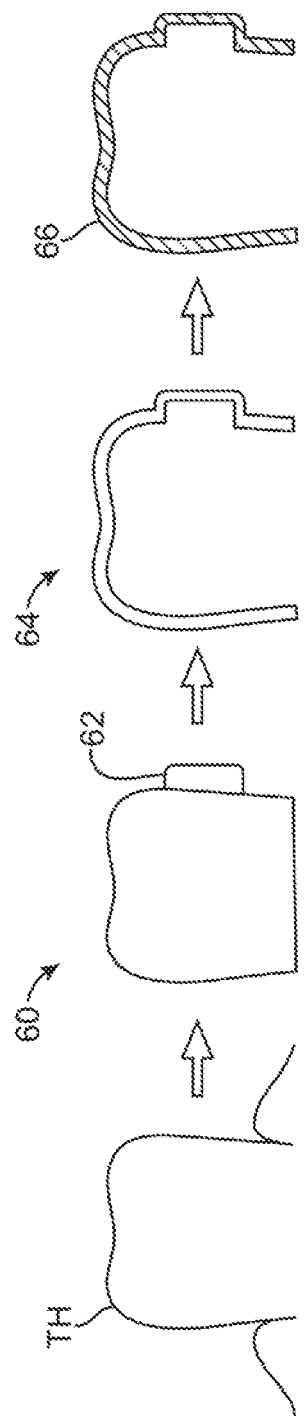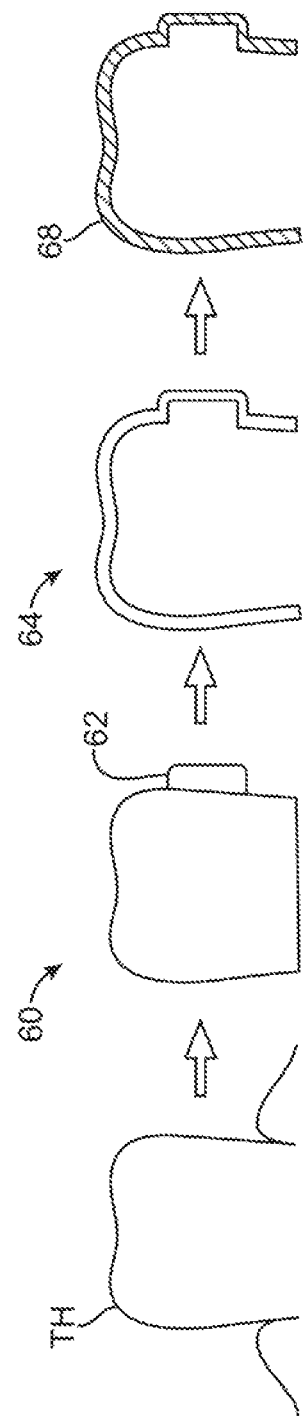

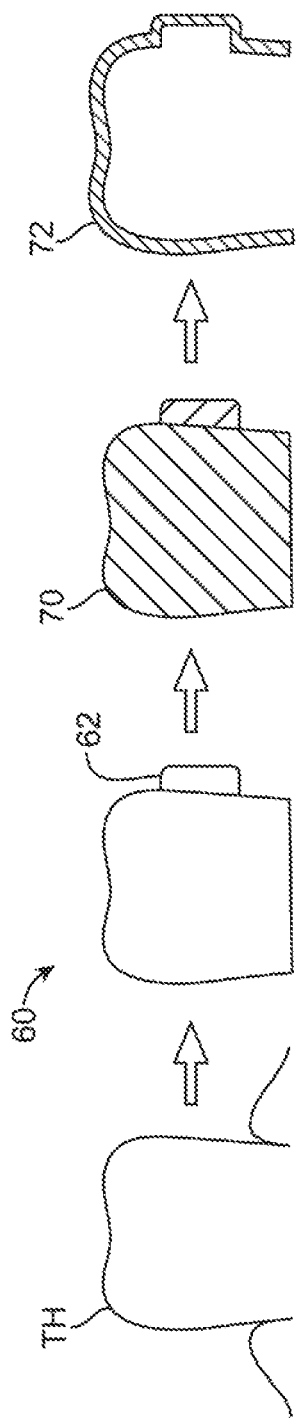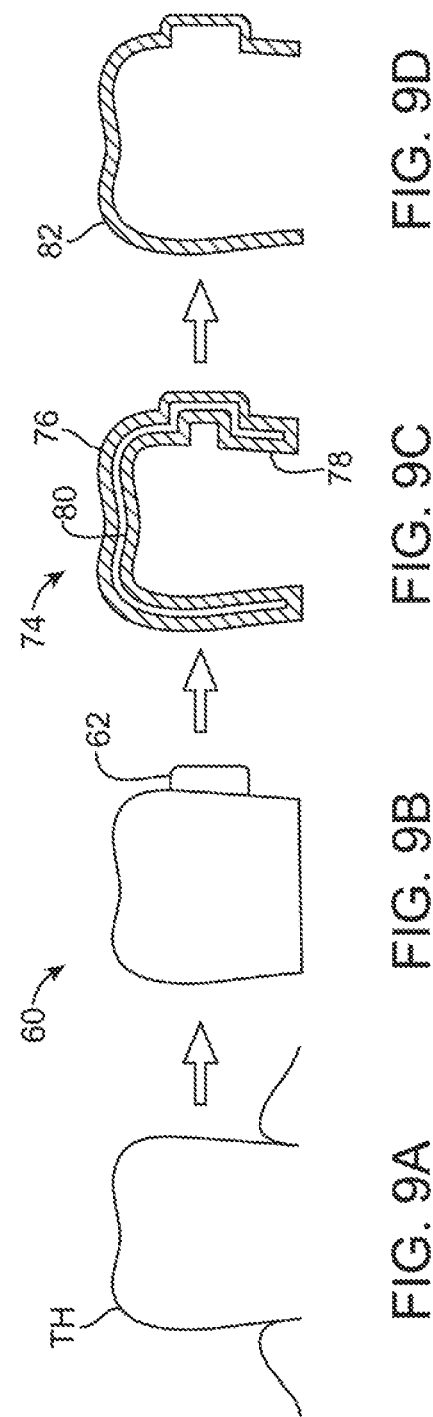

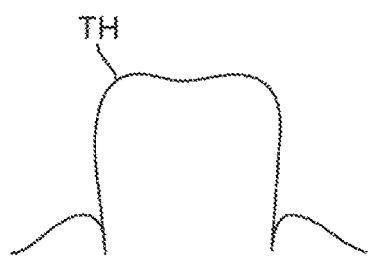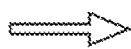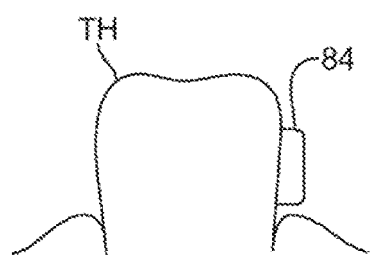
FIG. 10A  FIG. 10B

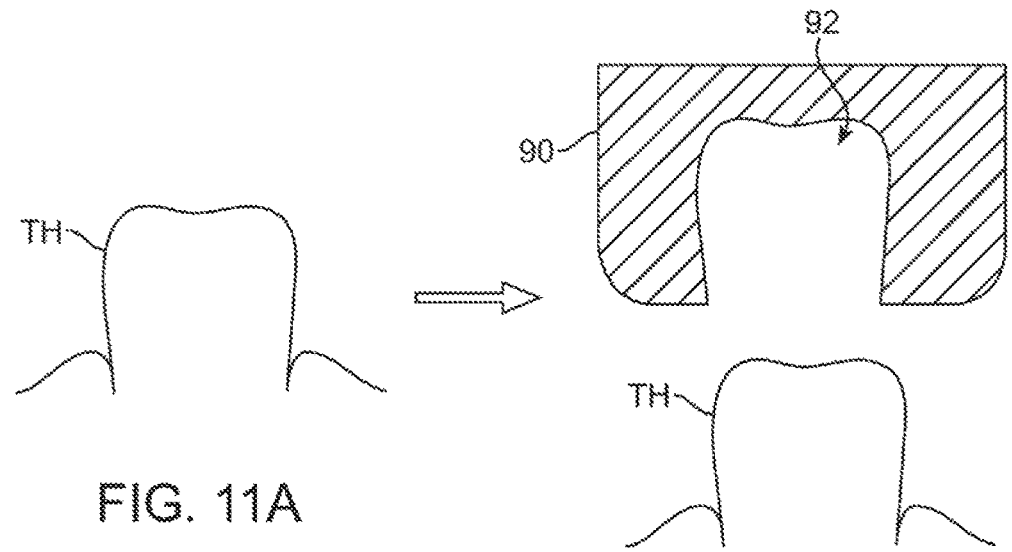
FIG. 11A
FIG. 11B
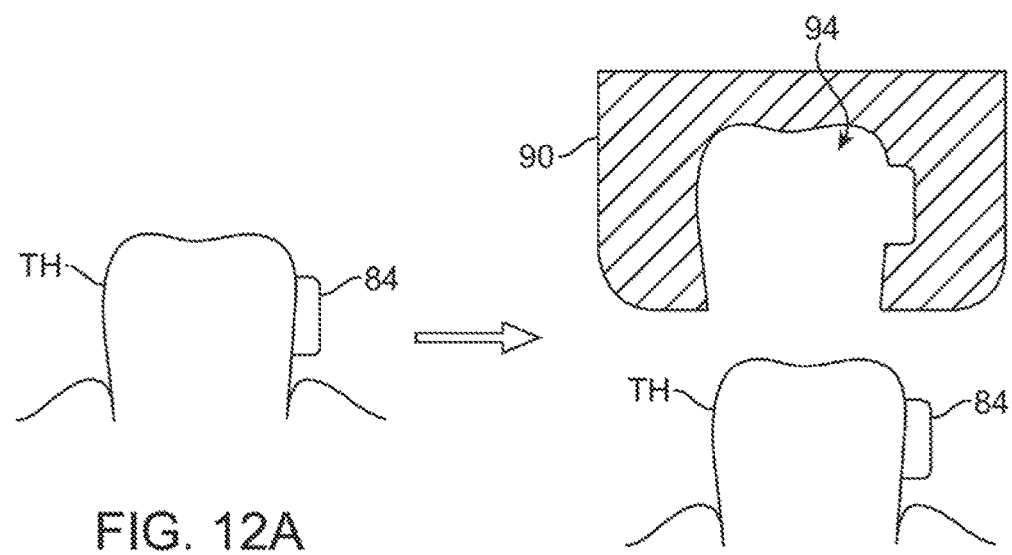
FIG. 12A
FIG. 12B

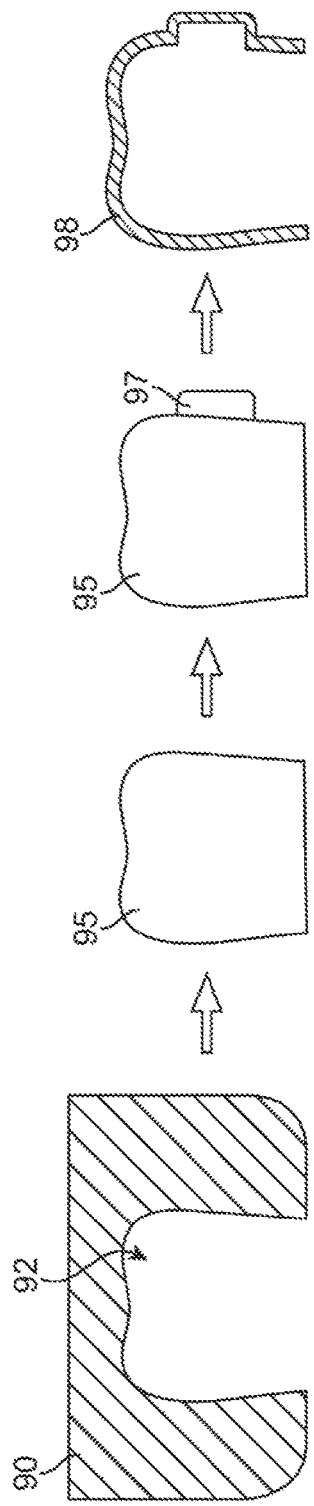
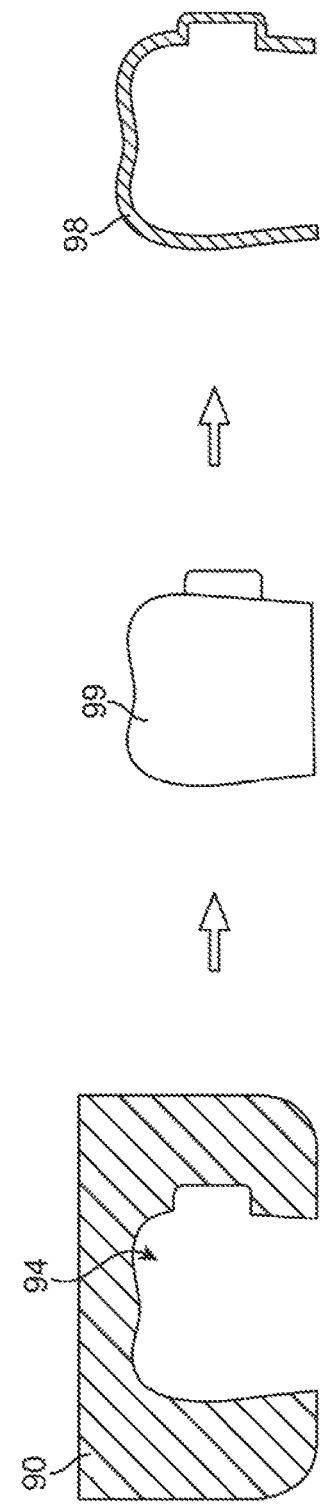

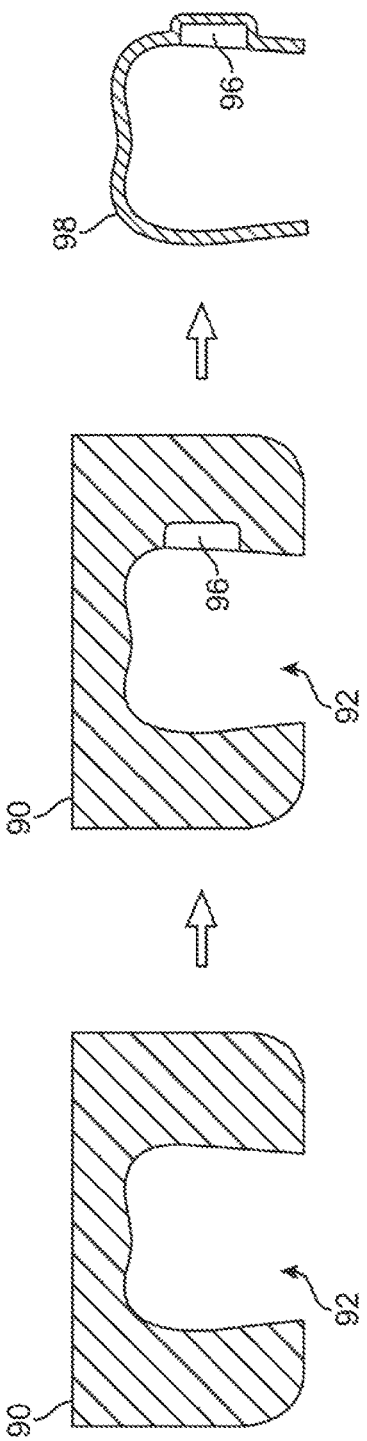

SYSTEMS AND METHODS FOR INTRA-ORAL BASED COMMUNICATIONS

CROSS-REFERENCE TO RELATED APPLICATIONS

This application is a continuation of U.S. patent application Ser. No. 14/176,666 filed Feb. 10, 2014 (now U.S. Pat. No. 9,247,332 issuing Jan. 26, 2016), which is a continuation of U.S. patent application Ser. No. 13/615,189 filed Sep. 13, 2012 (now U.S. Pat. No. 8,649,536 issued Feb. 11, 2014), which is a continuation of U.S. patent application Ser. No. 12/175,240 filed Jul. 17, 2008 (now U.S. Pat. No. 8,295,506 issued Oct. 23, 2012), the contents of which are incorporated herein by reference in their entirety.

BACKGROUND OF THE INVENTION

Traditionally field workers such as fire fighters and plant workers communicate using two way radios such as radios supplied by Motorola, Inc. As mentioned in United States Patent 20070142072, two way radios allow users the ability to wirelessly communicate with others on a small network. Most two way radios use various channels or frequencies for communication. Monitoring of more than one channel allows a user to communicate with a plurality of people for a variety of purposes. In a security environment, for instance, channel 1 may be used to communicate about and monitor emergency conditions. Channel 2 may be used to communicate about and monitor major security threats. Channel 3 may be used to communicate about and monitor minor security threats. A user may monitor all three channels by using a two way radio having a scanning mode. Other devices that can be used instead of two way radios include cellular telephones. These devices enable personal communication by allowing telephone access from anywhere within reach of wireless network infrastructure (e.g., cellular networks, communication satellites, or other infrastructure of other wireless networks adapted for voice communications). However, one restriction is that these devices are typically desktop devices or hand-held devices and thus do not provide hands-free communications capability.

Moreover, in as much as the use of handheld wireless voice communication devices is not restricted to homes and offices, such devices will often be used in environments where there is considerable ambient noise. Examples of such environments include busy urban settings, inside moving vehicles and on factory floors. Ambient noise in an environment can degrade the intelligibility of received voice audio and thereby interfere with users' ability to communicate.

U.S. Pat. No. 6,917,688 discloses an adaptive noise canceling microphone system for extracting a desired signal, in particular a desired speech signal, having two microphones being arranged at a predefined distance from each other; a signal forming system (SFS) being adapted to receive a first and second input signals resulting from sounds received by the two microphones wherein an acoustical signal component in the first input signal is determined, wherein an acoustical signal component in the second input signal is determined, wherein the acoustical signal component in the first input signal is enhanced to generate a speech enhanced signal, and wherein the acoustical signal component in the second input signal is suppressed to generate a speech nulled signal; an adaptive noise cancellation filtering circuit being adapted to receive the speech enhanced signal and the speech nulled signal, wherein the noise in the speech enhanced signal is cancelled using the speech nulled signal as reference, thereby generating an output filtered signal representing the desired signal.

United States Patent 20060270467 discusses enhancing the intelligibility of speech emitted into a noisy environment by filtering ambient noise with a filter that simulates the physical blocking of noise by at least a part of a voice communication device and determining a frequency dependent SNR of received voice audio relative to ambient noise is computed on a perceptual (e.g. Bark) frequency scale. Formants are identified and the SNR in bands including certain formants are modified with formant enhancement gain factors in order to improve intelligibility.

However, in certain industrial, emergency, government and military applications, such noise filtering is insufficient to provide high quality, hands-free, yet inconspicuous communication capability for field personnel.

SUMMARY OF THE INVENTION

In one aspect, systems and methods are disclosed for capturing sound including user speech for communication by mounting one or more intra-oral microphones to capture sound such as user speech; and mounting a mouth wearable communicator in the oral cavity to communicate sound with a remote unit.

Implementations of the above aspect may include one or more of the following. The system performs noise cancellation. The intra-oral microphones can include a cardioid-type directional microphone and an omni-directional microphone. The system can point a first intra-oral microphone toward the oral cavity and a second intra-oral microphone away from the oral cavity. The system can perform spatial and temporal filtering to enhance the sound from a predetermined direction and over a predetermined frequency band, and suppress signals from other directions. The one or more intra-oral microphones can be tissue mounted or can be mounted on one or more teeth. The system can render sound output using a bone conduction device.

In another aspect, a communication device includes a mouth wearable communicator to communicate sound with a remote unit; and one or more intra-oral microphones coupled to the mouth wearable communicator and positioned near the front of a mouth to capture sound.

Implementations of the above aspect may include one or more of the following. The one or more intra-oral microphones can be noise canceling microphones. The one or more intra-oral microphones can include a cardioid-type directional microphone and an omni-directional microphone. One of the intra-oral microphones can be pointed toward a mouth cavity and the other intra-oral microphone can be pointed away from the mouth cavity. The one or more intra-oral microphones can perform spatial and temporal filtering to enhance the sound or user speech from a predetermined direction and over a predetermined frequency band, and suppress signals from other directions. The intra-oral microphones can be positioned on one or more teeth or oral tissue. The mouth wearable communicator can include a bone conduction device to render sound audible to the wearer. The mouth wearable communicator can be a custom oral device. One or more medical sensors can be embedded therein. A data storage device can also be embedded in the device.

BRIEF DESCRIPTION OF THE DRAWINGS

FIGS. 6A to 6D illustrate one method for forming the oral appliance by scanning a digital image of the dentition, manipulating the digital image, and generating the oral appliance via any number of three-dimensional printing methods.

FIGS. 7A to 7D illustrate another method for forming the oral appliance by scanning a digital image of the dentition, manipulating the digital image, and generating the oral appliance via any number of machining methods.

FIGS. 8A to 8D illustrate another method for forming the oral appliance by scanning a digital image of the dentition, manipulating the digital image, and generating the oral appliance by creating a physical replica of the dentition for thermal forming.

FIGS. 9A to 9D illustrate yet another method for forming the oral appliance by scanning a digital image of the dentition, manipulating the digital image, and generating the oral appliance via an injectable mold.

FIGS. 10A and 10B show another method in which the housing for the electronics and/or transducer assembly may be adhered directly to the patient's tooth or teeth prior to scanning.

FIGS. 11A and 11B illustrate yet another method utilizing the creation of a direct impression of the dentition via a mold.

FIGS. 11C to 11F illustrate one method for utilizing a mold or model formed from a direct impression of the dentition to thermally form an oral appliance thereupon.

FIGS. 12A and 12B illustrate yet another method utilizing a direct impression of the dentition having a housing adhered thereto.

FIGS. 12C to 12E illustrate another method for utilizing a mold or model having a housing formed therein created from a direct impression of the dentition to thermally form an oral appliance thereupon.

FIGS. 13A to 13C illustrate yet another method where the impression may have a housing formed therein prior to forming the oral appliance.

FIGS. 14A to 14C illustrate yet another method where the electronics and/or transducer assembly may be integrated with the impression.

DETAILED DESCRIPTION OF THE INVENTION

Figure 1:
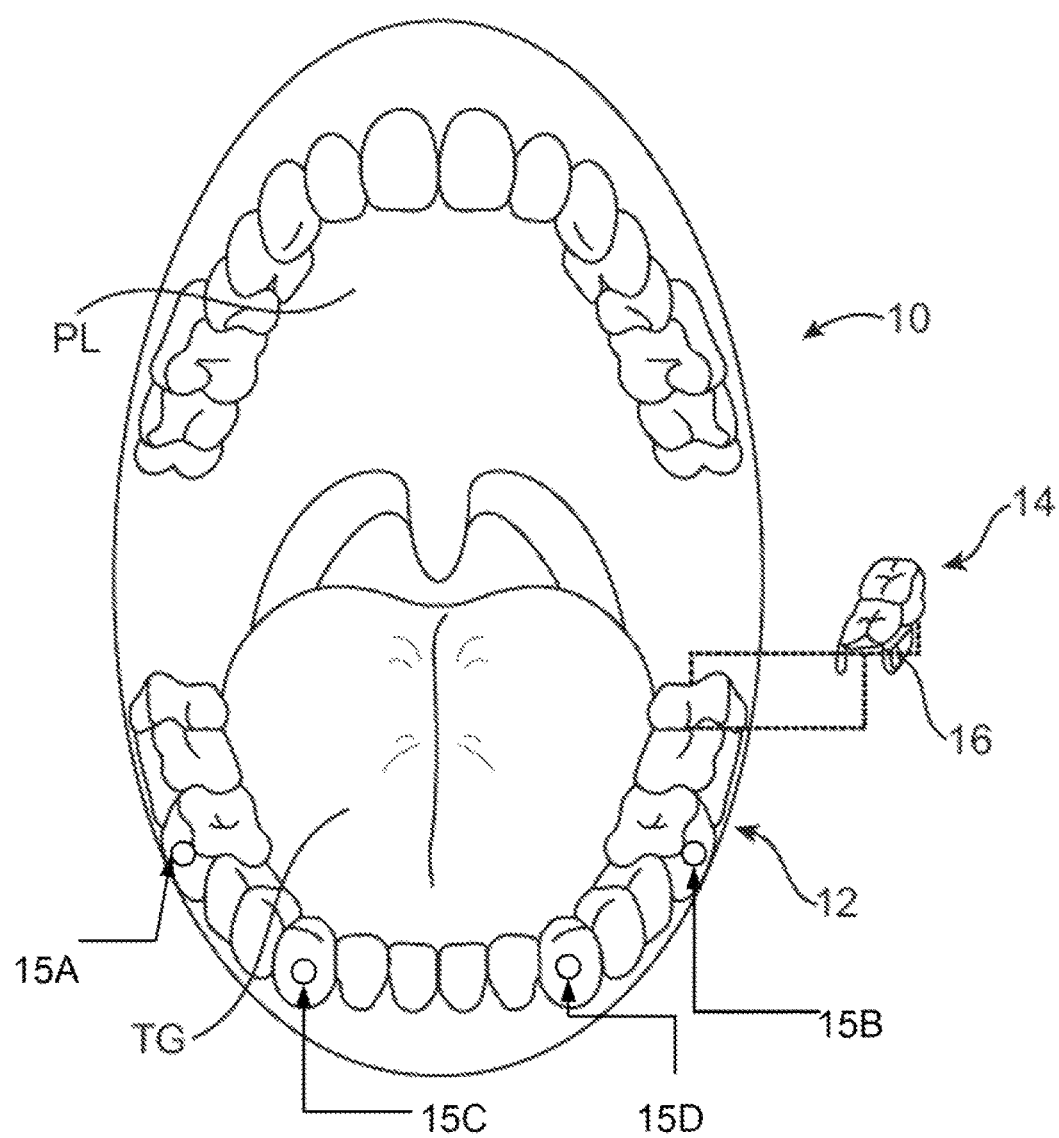
FIG. 1 illustrates the dentition of a patient's teeth and one variation of a two-way communication device including noise cancelling microphones to capture and transmit speech as a removable oral appliance.

Turning now to more details on the system 1, as shown in FIG. 1, a patient's mouth and dentition 10 is illustrated showing one possible location for removably attaching two-way communication assembly 14 upon or against at least one tooth, such as a molar 12. The patient's tongue TG and palate PL are also illustrated for reference. An electronics and/or transducer assembly 16 may be attached, adhered, or otherwise embedded into or upon the assembly 14, as described below in further detail.

The two way communication assembly 14 can have a microphone array with paired microphones 15A and 15B to pick up sound. The microphones 15A and 15B can be mounted on the oral appliance, on the rear molars or alternatively on the lingual side of the front teeth. In other embodiments, the microphones 15A and 15B can be intraoral microphones or extraoral microphones. In one embodiment, the microphones can be mounted on an oral appliance, on the rear molars or alternatively on the lingual side of the front teeth. In FIG. 1, microphones 15A-15B are mounted on the buccal surface of an appliance such as a retainer and the microphones 15A-15B point toward the wearer's cheek. These microphones pick up the wearer's own sound. In this configuration the wearer's sound is picked from outside of oral cavity. Also shown in FIG. 1 are alternate microphone pairs 15C-15D positioned near the front of the wearer's mouth. Similar to microphones 15A-15B, microphones 15C-15D face the wearer's cheek. The intra oral microphones 15C-15D are also installed on the buccal surface of teeth touching the surface of cheeks to pick sounds conducted by the wearer's head including the wearer's own voice.

The microphone cancels environmental noise and transmits a user's voice to a remote user, station or building. This embodiment provides the ability to cancel environmental noises while transmitting subject's own voice to the remote station such as another user or a call center. As the microphone is in a fixed location (compared to ordinary wireless communication devices) and very close to user's own voice, the system can handle environmental noise reduction that is important in working in high noise areas. As such, the two way communication device can be used by workers in loud environments such as a professional entertainer or athlete and/or support personnel, a soldier, a medic, a fireman, an emergency worker, among others.

In one embodiment, the mouth wearable communication assembly 14 has a housing having a shape which is conformable to at least a portion of at least one tooth; an actuatable transducer disposed within or upon the housing and in vibratory communication with a surface of the at least one tooth; and a wireless communication transceiver coupled to the transducer to provide received sound to the user and to provide communication for the user. The two way communication device can be an oral appliance having a shape which conforms to the at least one tooth. An electronic assembly can be disposed within or upon the housing and which is in communication with the transducer.

In one embodiment, the microphones 15A and 15B face outwardly away from the mouth to focus on the sound coming out of the mouth only and the microphone pair would cancel any sounds not directly in front of the mouth. This embodiment would be used as a communication device for picking up the user's voice. In one embodiment, the microphone pair can include a cardioid-type directional microphone and an omni-directional microphone combined in an acoustically coupled way. The two microphones, together with an adaptive control circuit, produce a very narrow 3-dimensional beam for acquiring the desired speech signal. In addition to microphones, accelerometers or other devices applicable for detecting sound waves can be used.

In another embodiment, the microphones 15A and 15B face in opposite directions with one facing inwardly toward the mouth and the other facing outwardly away from the mouth. In another embodiment, the microphones 15A and 15B face in opposite directions with one facing inwardly toward the mouth and the other facing outwardly away from the mouth.

In one embodiment, the paired microphones 15A-15B detect ambient noise in a first sound waveform, and convert the waveform to electrical signals. An onboard processor processes the recorded signal so that it is exactly out of phase with the ambient noise detected by the microphones 15A-15B, thus canceling ambient noise and leaving only the user's speech.

In one duo-microphone embodiment, both microphones can be positioned near the front of the user's mouth to pick-up the user's voice as the primary desired signal as well as external noise as a secondary signal. Since the speech is very close to the microphone pair, the speech signal picked up by the microphones can be separated using clustering techniques into a strong signal (speech) and a distant, weak signal (noise) pair. The weak signal can be discarded and only the strong signal is used as the speech signal.

In another duo-microphone embodiment, one microphone can be pointed toward the throat to pick-up the user's voice as the desired source, and another microphone can be pointed away from the mouth to pick up external noise source. The signal picked up by the microphone pointed toward the throat can be used to adaptively cancel the noise signal from the signal picked up by the microphone pointed away from the mouth.

Other noise cancellation arrangements can be used. For example, in a single microphone embodiment, one microphone is used to pick up the desired speech signal with noise. The noise spectrum is estimated and subtracted from the speech signal (containing the noise) picked up by the microphone. In this way, the desired speech signal is separated from the noise.

A further embodiment uses more than two microphones. This embodiment uses a spatial and temporal filtering method to enhance the desired speech signal from a specific direction and over an interested frequency band, and suppress signals from other directions. The desired signal obtained with this system has a high signal to noise (SNR) ratio. Alternatively, two microphones can be used to form a first-order microphone system for noise cancellation. This microphone system uses the differential property of sound field to form a fixed beam pattern in front of the user's mouth.

In one embodiment, the system of FIG. 1 provides an electronic and transducer device that can be attached, adhered, or otherwise embedded into or upon a removable oral appliance or other oral device to form a two-way communication assembly. The communication assembly 14 can be used by emergency and security personnel, medical personnel, municipal workers, industrial plant workers, individuals in loud environments that require communications (musicians, athletes and their support personnel), and the military, among others.

In another embodiment, the device of FIG. 1 provides an electronic and transducer device that can be attached, adhered, or otherwise embedded into or upon a removable oral appliance or other oral device to form a medical tag containing patient identifiable information. Such an oral appliance may be a custom-made device fabricated from a thermal forming process utilizing a replicate model of a dental structure obtained by conventional dental impression methods. The electronic and transducer assembly may receive incoming sounds either directly or through a receiver to process and amplify the signals and transmit the processed sounds via a vibrating transducer element coupled to a retainer, an appliance, a tooth or other bone structure, such as the maxillary, mandibular, or palatine bone structure. In one embodiment, the retainer can be fitted over the tooth to provide sound transmission to the bone. For example, the device can include sensors that detect chemicals present in the user's saliva and provide medical information on the user. The device can also sense heart rate, EKG, and other bio-signals that can be picked up within the mouth. Additionally, the device 1 can communicate with a medical data collection module that can collect vital signs such as temperature, heart rate, EKG, respiration rate, and other vital signs or medical information.

An exemplary process to collect medical information from the user (such as fire fighting personnel) and for supporting bone-conduction two way communication can be as follows:

Periodically collect vital sign and other medical information

Check to see if the user is using the long range transceiver for talking

Figure 2A:
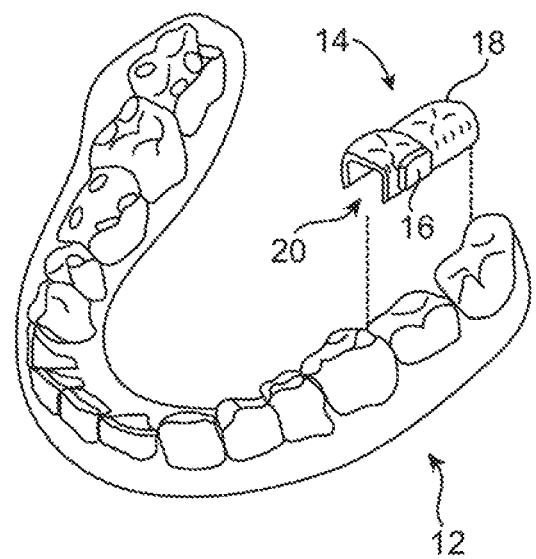
FIG. 2A illustrates a perspective view of the lower teeth showing one exemplary location for placement of the removable oral appliance communication device.

If long range transceiver is not used for talking, upload medical history of the user to a remote computer over the long range transceiver Remote computer detects if the medical data falls outside of an acceptable range that requires medical intervention Alarm sound is generated to the user alerting him/her that there is a potential problem and that he/she should contact Command post If medical intervention is required, the remote computer alerts the user's commander for action to assist the user Self-help instructions can be sent through the transceiver to the bone conduction communication device FIG. 2A shows a perspective view of the patient's lower dentition illustrating the hearing aid assembly 14 comprising a removable oral appliance 18 and the electronics and/or transducer assembly 16 positioned along a side surface of the assembly 14. In this variation, oral appliance 18 may be fitted upon two molars 12 within tooth engaging channel 20 defined by oral appliance 18 for stability upon the patient's teeth, although in other variations, a single molar or tooth may be utilized. Alternatively, more than two molars may be utilized for the oral appliance 18 to be attached upon or over. Moreover, electronics and/or transducer assembly 16 is shown positioned upon a side surface of oral appliance 18 such that the assembly 16 is aligned along a buccal surface of the tooth 12; however, other surfaces such as the lingual surface of the tooth 12 and other positions may also be utilized. The figures are illustrative of variations and are not intended to be limiting; accordingly, other configurations and shapes for oral appliance 18 are intended to be included herein.

Figure 2B:
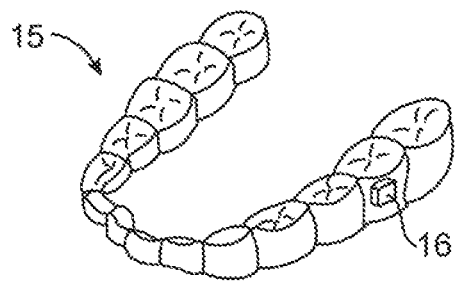
FIG. 2B illustrates another variation of the removable oral appliance in the form of an appliance which is placed over an entire row of teeth in the manner of a mouthguard.

FIG. 2B shows another variation of a removable oral appliance in the form of an appliance 15 which is placed over an entire row of teeth in the manner of a mouthguard. In this variation, appliance 15 may be configured to cover an entire bottom row of teeth or alternatively an entire upper row of teeth. In additional variations, rather than covering the entire rows of teeth, a majority of the row of teeth may be instead be covered by appliance 15. Assembly 16 may be positioned along one or more portions of the oral appliance 15.

Figure 2C:
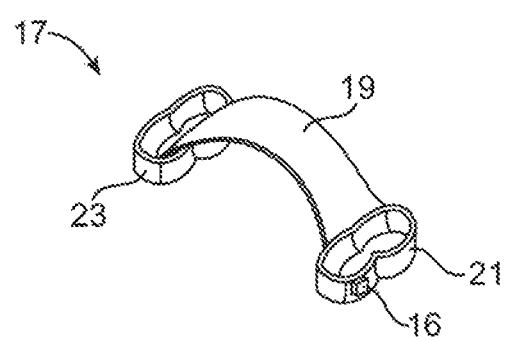
FIG. 2C illustrates another variation of the removable oral appliance which is supported by an arch.

FIG. 2C shows yet another variation of an oral appliance 17 having an arched configuration. In this appliance, one or more tooth retaining portions 21, 23, which in this variation may be placed along the upper row of teeth, may be supported by an arch 19 which may lie adjacent or along the palate of the user. As shown, electronics and/or transducer assembly 16 may be positioned along one or more portions of the tooth retaining portions 21, 23. Moreover, although the variation shown illustrates an arch 19 which may cover only a portion of the palate of the user, other variations may be configured to have an arch which covers the entire palate of the user.

Figure 2D:
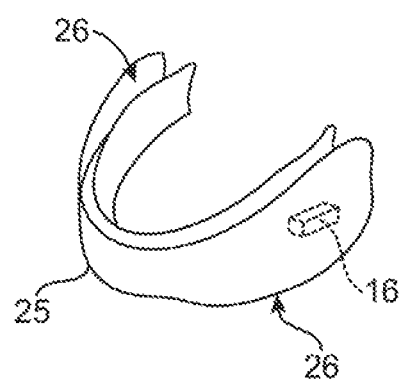
FIG. 2D illustrates another variation of an oral appliance configured as a mouthguard.

FIG. 2D illustrates yet another variation of an oral appliance in the form of a mouthguard or retainer 25 which may be inserted and removed easily from the user's mouth. Such a mouthguard or retainer 25 may be used in sports where conventional mouthguards are worn; however, mouthguard or retainer 25 having assembly 16 integrated therein may be utilized by persons, hearing impaired or otherwise, who may simply hold the mouthguard or retainer 25 via grooves or channels 26 between their teeth for receiving instructions remotely and communicating over a distance.

Generally, the volume of electronics and/or transducer assembly 16 may be minimized so as to be unobtrusive and as comfortable to the user when placed in the mouth. Although the size may be varied, a volume of assembly 16 may be less than 800 cubic millimeters. This volume is, of course, illustrative and not limiting as size and volume of assembly 16 and may be varied accordingly between different users.

Figure 3:
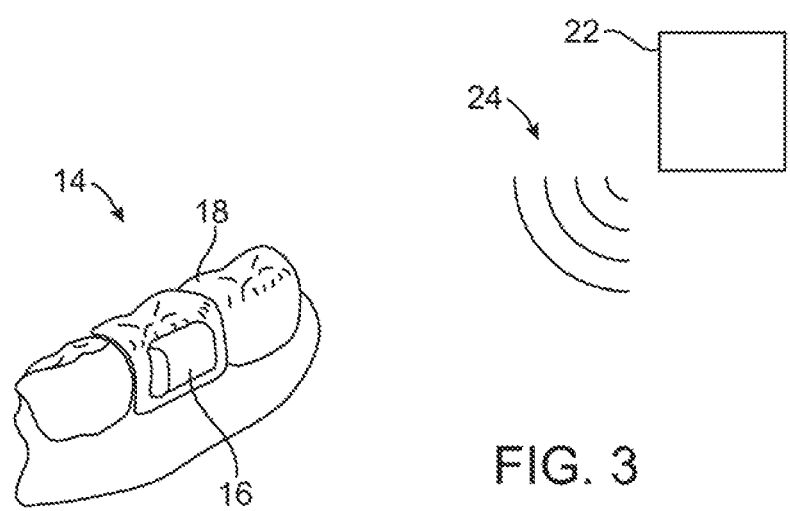
FIG. 3 illustrates a detail perspective view of the oral appliance positioned upon the patient's teeth utilizable in combination with a transmitting assembly external to the mouth and wearable by the patient in another variation of the device.

In one variation, with assembly 14 positioned upon the teeth, as shown in FIG. 3, an extra-buccal transmitter assembly 22 located outside the patient's mouth may be utilized to receive auditory signals for processing and transmission via a wireless signal 24 to the electronics and/or transducer assembly 16 positioned within the patient's mouth, which may then process and transmit the processed auditory signals via vibratory conductance to the underlying tooth and consequently to the patient's inner ear.

The transmitter assembly 22, as described in further detail below, may contain a microphone assembly as well as a transmitter assembly and may be configured in any number of shapes and forms worn by the user, such as a watch, necklace, lapel, phone, belt-mounted device, etc.

Figure 4:
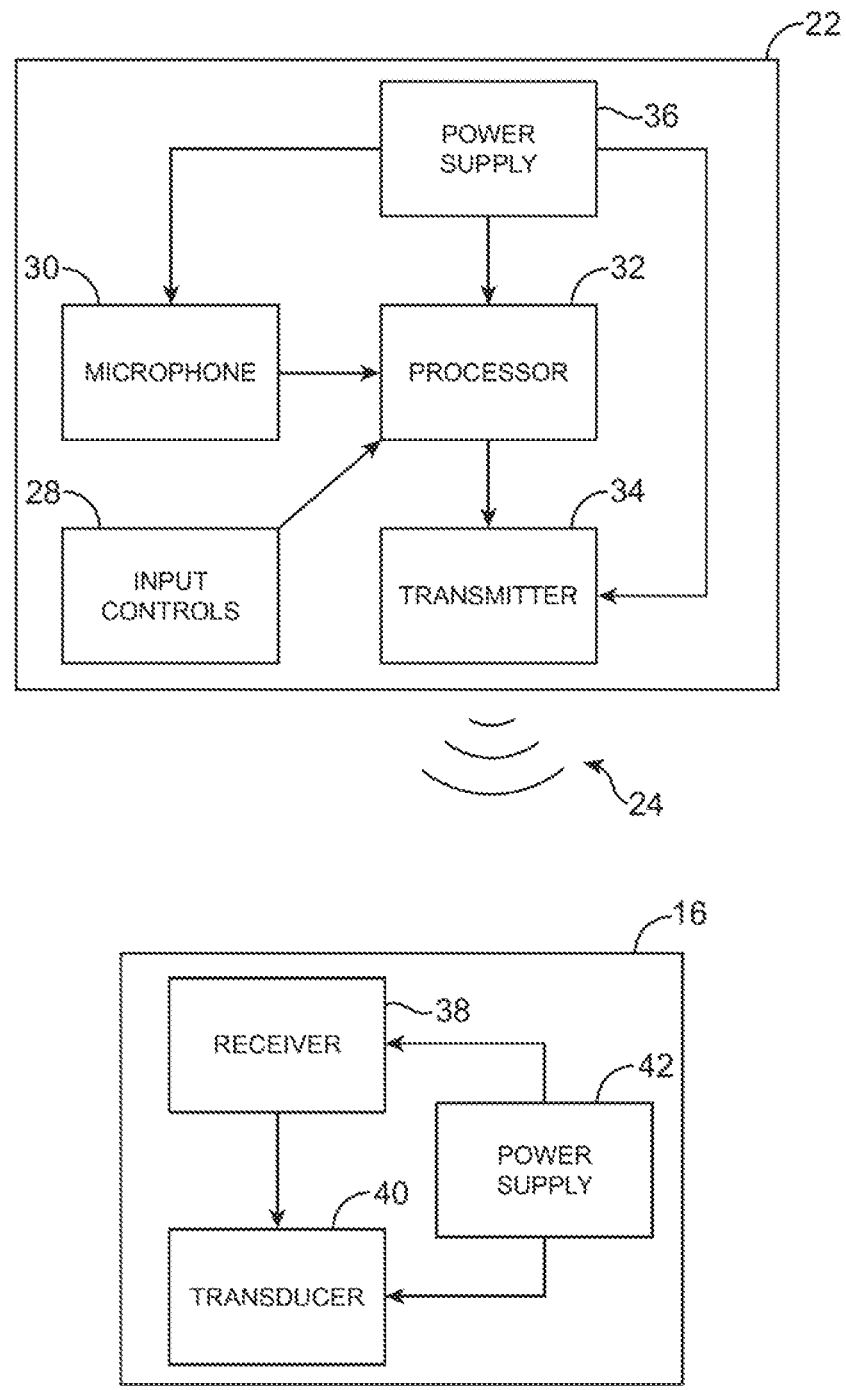
FIG. 4 shows an illustrative configuration of the individual components in a variation of the oral appliance device having an external transmitting assembly with a receiving and transducer assembly within the mouth.

FIG. 4 illustrates a schematic representation of one variation of communication device such as a hearing aid assembly 14 utilizing an extra-buccal transmitter assembly 22, which may generally comprise microphone 30 for receiving sounds and which is electrically connected to processor 32 for processing the auditory signals. Processor 32 may be connected electrically to transmitter 34 for transmitting the processed signals to the electronics and/or transducer assembly 16 disposed upon or adjacent to the user's teeth. The microphone 30 and processor 32 may be configured to detect and process auditory signals in any practicable range, but may be configured in one variation to detect auditory signals ranging from, e.g., 250 Hertz to 20,000 Hertz.

With respect to microphone 30, a variety of various microphone systems may be utilized. For instance, microphone 30 may be a digital, analog, and/or directional type microphone. Such various types of microphones may be interchangeably configured to be utilized with the assembly, if so desired.

Power supply 36 may be connected to each of the components in transmitter assembly 22 to provide power thereto. The transmitter signals 24 may be in any wireless form utilizing, e.g., radio frequency, ultrasound, microwave, Blue Tooth® (BLUETOOTH SIG, INC., Bellevue, Wash.), etc. for transmission to assembly 16. Assembly 22 may also optionally include one or more input controls 28 that a user may manipulate to adjust various acoustic parameters of the electronics and/or transducer assembly 16, such as acoustic focusing, volume control, filtration, muting, frequency optimization, sound adjustments, and tone adjustments, etc.

The signals transmitted 24 by transmitter 34 may be received by electronics and/or transducer assembly 16 via receiver 38, which may be connected to an internal processor for additional processing of the received signals. The received signals may be communicated to transducer 40, which may vibrate correspondingly against a surface of the tooth to conduct the vibratory signals through the tooth and bone and subsequently to the middle ear to facilitate hearing of the user. Transducer 40 may be configured as any number of different vibratory mechanisms. For instance, in one variation, transducer 40 may be an electromagnetically actuated transducer. In other variations, transducer 40 may be in the form of a piezoelectric crystal having a range of vibratory frequencies, e.g., between 250 to 20,000 Hz.

Power supply 42 may also be included with assembly 16 to provide power to the receiver, transducer, and/or processor, if also included. Although power supply 42 may be a simple battery, replaceable or permanent, other variations may include a power supply 42 which is charged by inductance via an external charger. Additionally, power supply 42 may alternatively be charged via direct coupling to an alternating current (AC) or direct current (DC) source. Other variations may include a power supply 42 which is charged via a mechanical mechanism, such as an internal pendulum or slidable electrical inductance charger as known in the art, which is actuated via, e.g., motions of the jaw and/or movement for translating the mechanical motion into stored electrical energy for charging power supply 42.

Figure 5:
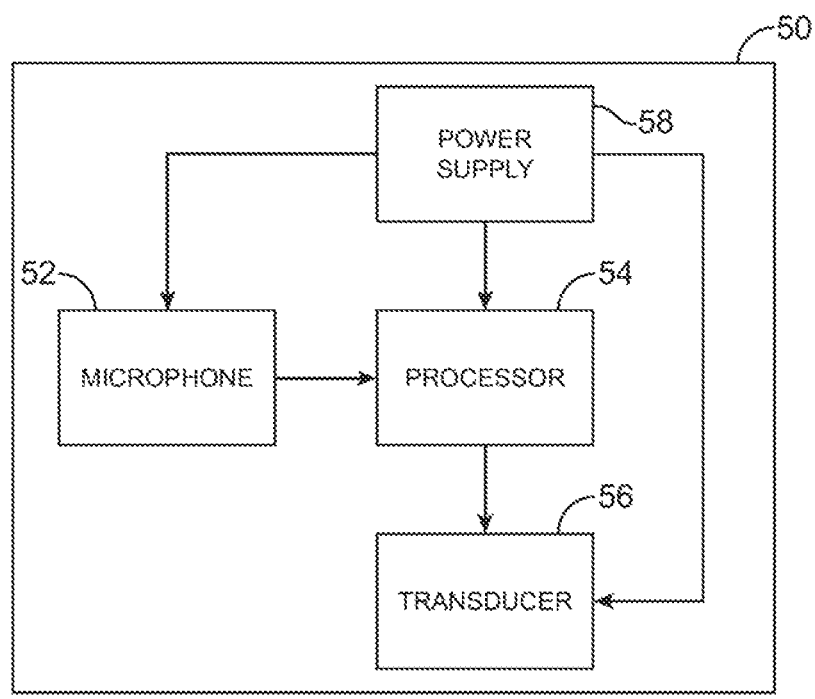
FIG. 5 shows an illustrative configuration of another variation of the device in which the entire assembly is contained by the oral appliance within the user's mouth.

In another variation of assembly 16, rather than utilizing an extra-buccal transmitter, hearing aid assembly 50 may be configured as an independent assembly contained entirely within the user's mouth, as shown in FIG. 5. Accordingly, assembly 50 may include an internal microphone 52 in communication with an on-board processor 54. Internal microphone 52 may comprise any number of different types of microphones, as described above. Processor 54 may be used to process any received auditory signals for filtering and/or amplifying the signals and transmitting them to transducer 56, which is in vibratory contact against the tooth surface. Power supply 58, as described above, may also be included within assembly 50 for providing power to each of the components of assembly 50 as necessary.

The removable oral appliance 18 may be fabricated from various polymeric or a combination of polymeric and metallic materials using any variety of methods. For instance, in one variation of fabricating an oral appliance, a three-dimensional digital scanner may be used to image the dentition of the patient, particularly the tooth or teeth TH upon or about which the oral appliance is to be positioned. The scanned image may be processed via a computer to create a three-dimensional virtual or digital model 60 of the tooth or teeth TH, as shown in FIGS. 6A and 6B.

Various three-dimensional scanning modalities may be utilized to create the three-dimensional digital model 60. For instance, intra-oral cameras or scanners using, e.g., laser, white light, ultrasound, mechanical three-dimensional touch scanners, magnetic resonance imaging (MRI), computed tomography (CT), other optical methods, etc., may be utilized.

Once the three-dimensional image has been captured, the image may then be manipulated via conventional software to create a direct three-dimensional print of the model. Alternatively, the image may be used to directly machine the model. Systems such as computer numerical control (CNC) systems or three-dimensional printing processes, e.g., stereolithography apparatus (SLA), selective laser sintering (SLS), and/or other similar processes utilizing three-dimensional geometry of the patient's dentition may be utilized.

In another alternative, a mold may be generated from the print to then allow for thermal forming of the appliance directly upon the created mold. And yet in other variations, the three-dimensional image may be used to create an injection mold for creating the appliance. Each of these processes are described in further detail below.

Once the scanned image has been processed to create a three-dimensional virtual or digital model 60 of the tooth or teeth TH, the housing 62 for the electronics/transducer assembly may be digitally imposed or created in the digital model 60. Alternatively, a physical model of the housing may be positioned upon the appropriate tooth or teeth TH and the dentition with the housing may be scanned to create the digital model 60.

In either case, the resulting digital model 60 may be utilized to create a three-dimensional virtual or digital model of the appliance 64 having the housing 62 integrated therewith, as shown in the partial cross-sectional view in FIG. 6C. The digital model of the appliance 64 may then be used to print or create the physical oral appliance 66, as shown in FIG. 6D. Accordingly, an oral appliance 66 which conforms to the patient's dentition may be formed to ensure secure contact upon or against the dentition while maintaining comfort to the user.

In another alternative method, once the three-dimensional model of the appliance 64 has been created, as shown in FIGS. 7A to 7C, oral appliance 68 may be machined directly, e.g., utilizing computer numerical control machining, from polymeric materials to create the appliance 68, as shown in FIG. 7D.

In yet another alternative, once the appropriate tooth or teeth TH has been three-dimensionally scanned and the housing 62 has been included, as shown in FIGS. 8A and 88B, a physical model of the dentition 70 may be created utilizing any of the processes above, such as three-dimensional printing, machining, etc, as shown in FIG. 8C. With the model of the dentition 70, oral appliance 72 may be thermal formed or otherwise molded about dentition 70 to create oral appliance which conforms securely and comfortably to the patient's dentition, as shown in FIG. 8D.

Another alternative is illustrated where once the three-dimensional virtual or digital model 60 has been created from the patient's dentition, as shown in FIGS. 9A and 9B, an forming mold 74 may be fabricated having an outer mold portion 76 and an inner mold portion 78 which forms a cavity or void 80 therebetween, as shown in FIG. 9C. The cavity or void 80 may be entirely filled with a settable polymer which when cured forms oral appliance 82, as shown in FIG. 9D, which may be removed from the mold portions 76, 78 to form appliance 82 which conforms securely and comfortably to the patient's dentition.

As mentioned above, although the housing for the electronics and/or transducer assembly may be digitally created on the three-dimensional digital model generated from the patient's scanned dentition, a housing replica 84 may alternatively be adhered temporarily to a patient's tooth or teeth TH prior to scanning the dentition, as shown in FIGS. 10A and 10B. In this manner, the three-dimensional scanner may create the digital image having the housing replica 84 already included.

Aside from digital imaging and scanning of a patient's dentition, an alternative mechanism for creating a conformable oral appliance may utilize impression molding of the appropriate dentition. One example is shown in FIGS. 11A and 11B where an impression 92 of a patient's dentition may be formed by utilizing a mold 90 filled with a suitable impression material, e.g., alginate, plaster, polyvinylsiloxane, polyurethane, polyacrylate, ethylene vinyl acetate, and blends or combinations thereof, etc.

An impression of the dentition may also be formed after a replica of housing mold 84 has been affixed temporarily to the tooth or teeth TH, as shown in FIG. 12A, prior to forming an impression 94 having the housing formed therein, as shown in FIG. 12B.

In either case, once the impression 92, 94 has been formed, the mold 90 may be filled with a plaster to create a permanent, three-dimensional mold or model of the appropriate dentition, which may then be used to thermally form an oral appliance or which may be scanned digitally to utilize any of the forming or machining processes, as described above. Alternatively, the impression 92, 94 itself may be scanned to render a three-dimensional model of the appropriate dentition and/or housing for processing, also as above.

As illustrated in FIGS. 11C to 11F, mold 90 having impression 92 formed therein may be used to form the three-dimensional mold or model 95, as mentioned above and as shown in FIG. 11D. In the case of mold or model 95, an electronics and/or transducer housing 97 may be attached or adhered to the mold or model 95, as shown in FIG. 11E, and the oral appliance 98 may then be thermal formed directly thereupon resulting in the oral appliance 98 appropriately formed having a housing, as shown in FIG. 11F.

Likewise, if mold 90 has an impression 94 already having a housing formed therein, as shown in FIG. 12C, a mold or model 99 may be formed, e.g., from plaster, resulting in a three-dimensional mold or model 99, as shown in FIG. 12D. The oral appliance 98 may then be thermal formed directly over the mold or model 99, to result in the appliance 98 of FIG. 12E.

In the case of utilizing the mold 90 to create a physical mold or model, the resulting mold or model may alternatively be scanned to create a digital image of the dentition, as described above, rather than thermal forming directly upon the mold or model.

In another variation, the mold 90 having an impression 92 formed therein may have an electronics and/or transducer assembly 96 impressed into the mold 90, as shown in FIGS. 13A and 13B. With the assembly 96 desirably positioned, the mold material may be cured or otherwise activated to harden, after which oral appliance 98 may be machined or formed therefrom resulting in an appliance 98 which conforms with the user's dentition, as shown in FIG. 13C.

Likewise, once an impression 94 has been formed with the housing mold included, as shown in FIG. 14A, electronics and/or transducer assembly 96 may be positioned within the appropriate mold location, as shown in FIG. 14B, and the mold 90 may be cured or otherwise activated to harden. From this hardened mold 90, oral appliance 98 may likewise be formed via machining or forming while having the assembly 96 contained therein, as shown in FIG. 14C.

Figure 15A:
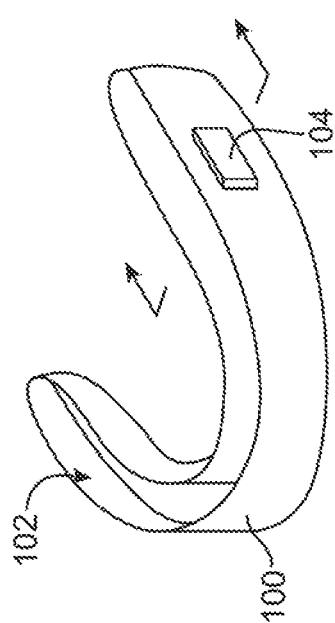
FIG. 15A shows an example of a dental tray having an electronics and/or transducer housing integrated therewith.

In yet another variation for forming or fabricating a conforming oral appliance, a dental tray 100 having a channel 102 for the user's dentition may be provided having an electronics and/or transducer housing 104 pre-formed along a lingual or buccal orientation of the dental tray 100. The example of FIG. 15A illustrates a full dental tray 100 having housing 104 located along a buccal surface of the tray 100, although partial trays may alternatively be utilized and other locations for housing 104 may also be implemented. An electronics and/or transducer assembly 106 may be pre-positioned within housing 104 while held via one or more temporary spacers 108, as shown in the partial cross-sectional view of FIG. 15B.

Figure 15D:
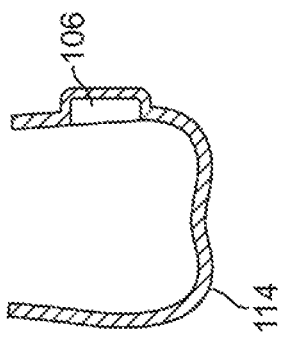
FIGS. 15B to 15D illustrate an example for utilizing the dental tray where a polymer may be conformed to the patient's dentition and hardened to create a conforming oral appliance.
Figure 15C:
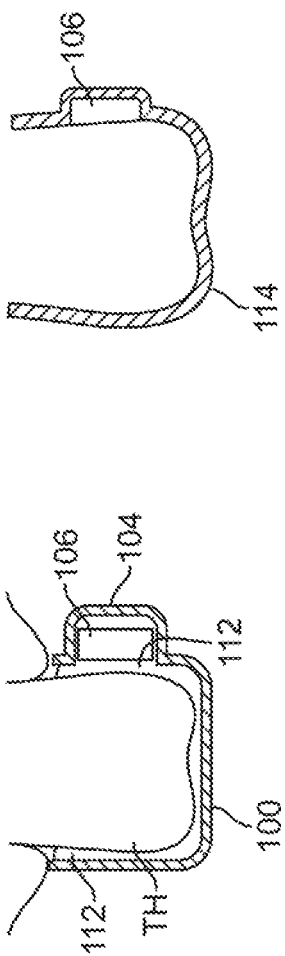
Figure 15B:
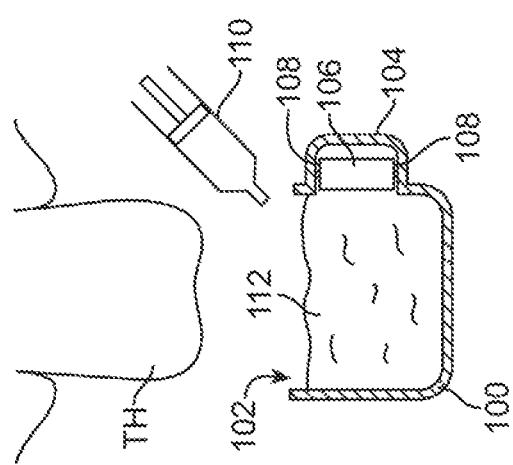

To form the oral appliance, tray 100 may be filled with any of the settable or curable materials 112 described above or may comprise a moisture-activated hydrogel utilizing, e.g., a dispenser 110, until the materials 112 fill any spaces or voids around assembly 106 to encapsulate assembly 106. The user may then place the tray 100 upon the appropriate portion of the dentition until the tooth or teeth TH is positioned sufficiently within tray 100, as shown in FIG. 15C. The tray 100 may be maintained upon the tooth or teeth TH until the material 112 has set and hardened. The tray 100 with the conforming impression may then be removed from the patient's mouth and the resulting oral appliance 114 and assembly 106 may be removed from tray 100 and trimmed or machined as appropriate, as shown in FIG. 15D. Alternatively, oral appliance 114 may be formed about the patient's dentition without assembly 106, which may be integrated, attached, or otherwise affixed, e.g., via adhesives, after oral appliance 114 has been formed.

In yet another alternative, tray 100 may comprise a preformed tray made from, e.g., ethylene vinyl acetate or polyethylene material, which may be heated or boiled to activate the tray 100. Once activated, the user may bite into tray 100 to at least partially mold or conform tray 100 to the user's dentition. Assembly 106 may be included or integrated after the tray 100 has been conformed.

The applications of the devices and methods discussed above are not limited to the treatment of hearing loss but may include any number of further treatment applications. Moreover, such devices and methods may be applied to other treatment sites within the body. Modification of the above-described assemblies and methods for carrying out the invention, combinations between different variations as practicable, and variations of aspects of the invention that are obvious to those of skill in the art are intended to be within the scope of the claims.

What is claimed is:

1. A communication device, comprising:
   a. a mouth wearable communicator to communicate sound with a remote unit, the mouth wearable communicator positioned inside an oral cavity; and
   b. first and second intra-oral microphones configured to face soft tissue of the cheek inside the oral cavity to capture sound outside of the oral cavity, wherein the first and second intra-oral microphones are each configured to capture sound outside of the oral cavity through the soft tissue of the cheek, and wherein at least one of the first and second intra-oral microphones comprises a cardioid-type directional microphone or an omni-directional microphone.

2. The device of claim 1, wherein at least one of the first and second intra-oral microphones comprises a noise canceling microphone.

3. The device of claim 1, wherein at least one of the first and second intra-oral microphones is configured to be tissue-mounted or tooth-mounted.

4. The device of claim 1, wherein at least one of the first and second intra-oral microphones comprises a tissue-mounted microphone or a tooth-mounted microphone.

5. The device of claim 1, wherein the first and second intra-oral microphones are configured to perform spatial and temporal filtering to enhance the sound from a predetermined direction and over a predetermined frequency band, and wherein the first and second intra-oral microphones are configured to suppress signals from other directions.

6. The device of claim 1, wherein the mouth wearable communicator comprises a bone conduction device.

7. A communication device, comprising:
   a. a mouth wearable communicator to communicate sound with a remote unit, the mouth wearable communicator positioned inside an oral cavity; and
   b. first and second intra-oral microphones, wherein the first and second intra-oral microphones are each configured to contact tissue of a cheek to capture sound from outside of the oral cavity through the tissue of a cheek, and wherein at least one of the first and second intra-oral microphones comprises a cardioid-type directional microphone or an omni-directional microphone.

8. The device of claim 7, wherein at least one of the first and second intra-oral microphones comprises a noise canceling microphone.

9. The device of claim 7, wherein at least one of the first and second intra-oral microphones is mounted on tissue or a tooth.

10. The device of claim 7, wherein the first and second intra-oral microphones are configured to perform spatial and temporal filtering to enhance the sound from a predetermined direction and over a predetermined frequency band, and are configured to suppress signals from other directions.

11. The device of claim 7, wherein the mouth wearable communicator comprises a bone conduction device.

12. A communication device, comprising:
   a. a mouth wearable communicator to communicate sound with a remote unit, the mouth wearable communicator positioned inside an oral cavity;
   b. one or more intra-oral microphones coupled to the mouth wearable communicator and contacting tissues in the oral cavity to capture sound outside of the oral cavity, wherein the one or more intra-oral microphones comprise at least a first intra-oral microphone pointed toward a mouth cavity and a second intra-oral microphone arranged to receive sound outside of the mouth cavity, and wherein at least one of the one or more intra-oral microphones comprises a cardioid-type directional microphone or an omni-directional microphone.

* * * * *